Patented Mar. 27, 1945

2,372,236

UNITED STATES PATENT OFFICE 2,372,236

REFRACTORY COMPOSITION

Eugene Wainer, Niagara Falls, N. Y., assignor to The Titanium Alloy Manufacturing Company, New York, N. Y., a corporation of Maine No Drawing. Application September 27, 1941, Serial No. 412,690

21 Claims. (Cl. 106—55)

This invention relates to quick setting refractory compositions, and particularly to such refractory compositions for use as molds for the precision casting of metal parts. By the term "refractory composition" is meant a composition which upon firing at an elevated temperature forms a coherent refractory mass.

Refractory slips suitable for the precision casting of metals, such as for use in dentistry, tools, dies, molds, gears, etc., must have a surprisingly large number of very precise and controllable chemical and physical properties. For example, the water or liquid content should be such that the cement flows easily; the cement should remain fluid for several minutes after mixture; it should not evolve gas bubbles; it should set up and harden in several minutes after casting without excessive evolution of heat to a strong tough mass accurately reproducing every detail of the model; on setting it should undergo a slight and controllable setting expansion; on heating to elevated temperatures it should expand to a definite value at a definite temperature according to the type of metal being cast; and the metal on cooling should have a smooth surface and undergo no reaction of any nature with the refractory, either chemical or the development of gas forming blowholes. Further, an ideal refractory composition will work with a wide variety of casting metals such as brasses, bronzes, aluminum alloys, zinc alloys, non-ferrous alloys generally, chromium-cobalt-tungsten alloys, steels, stainless steels, etc. Thus, it should be capable of withstanding the high temperatures necessary for casting alloys of high melting point, such as certain chromium alloys. Also, the ideal refractory should be capable of assembly in dry powder form, shelf stable for an indefinite period, requiring only the addition of water in specified amount to yield the desired properties.

It is therefore an object of this invention to provide a refractory composition for casting metals which can be completely compounded in dry form and which requires only the addition of water for application. It is another object to provide such a composition which is susceptible to any desired variation for any type of metal casting, such as variation in setting time, setting expansion, etc. It is a further object to provide such a composition which will permit the use of a wide variety of refractory grains and permit also the casting of perfectly clean metal with clean bright surfaces from which the refractory is easily removed. It is a still further object to provide such a composition which can be used for the casting of most ferrous and non-ferrous compositions including chrome-cobalt-tungsten alloys, copper, silver, gold, steel, stainless steel, brasses, bronzes, white metals, etc. Other objects will appear hereinafter.

These objects are accomplished by means of a dry refractory composition containing (in addition to the refractory base or refractory aggregate such as silica or zircon) an acid salt and a halide. In addition, a substance capable of reacting with the acid salt, which substance may be either a water insoluble compound or combination of zirconium oxide with one or more other metal or non-metal oxides or combinations thereof, or magnesia or a suitable derivative thereof or substitute therefor must be incorporated in the composition. For certain purposes, it may also be desired to add a fluosilicate. The prime requisite of all these ingredients is that they do not take up appreciable amounts of moisture on exposure to air. They act as bonding agents and impart other desirable characteristics to the composition.

The refractory base or refractory aggregate suitable for use in the practice of this invention may be any material insoluble or no more than very sparingly soluble in any of the ingredients of the bonding composition when water is added. Suitable refractory grains encompass most of the types commercially encountered, such as fireclay, silica, silicon carbide, mullite, sillimanite, cyanite, fused zirconia, zircon, aluminum silicates generally of refractory nature, forsterite, olivine, talc, porcelain, feldspar, garnet, etc. Of materials used as refractories about the only unsuitable materials are magnesia and chromite refractories, because of their highly basic nature. While any of these materials may be used if desired, depending upon the particular metal being cast, properly sized silica sand or ganister serves most applications of this highly specialized casting art.

The distribution of refractory grain sizes may vary over wide limits depending chiefly on the eventual service required. For example, the refractory portion may vary in particle size from —10 mesh to —325 mesh, and may consist of any suitable combination of grain sizes in this range. Thus, 75 parts by weight of —10 plus 100 mesh and 25 parts of —100 mesh material has been found suitable for coarse work. Other suitable compositions are 25 parts by weight of —10 plus 100 mesh and 75 parts of —100 mesh material, the —100 mesh material in both cases extending as fine as —325 mesh, or equal amounts of —100 mesh and +100 mesh materials. The above distributions of grain size are listed to indicate possibilities. For smooth metal surfaces generally, however, a grain size distribution as follows is preferred (percentages by weight):

| | Percent |
|---|---|
| −35 +60 mesh | 1 to 2 |
| −60 +100 mesh | 18 to 22 |
| −100 +150 mesh | 16 to 18 |
| −150 +200 mesh | 14 to 16 |
| −200 mesh | 40 to 50 |

Such a grain size can easily be obtained by dry milling of a good grade of sea sand or pure quartz grain sand, for example, in the case of silica in a porcelain ball mill.

Acid salts suitable for the purposes of this invention are the acid phosphates of ammonium, sodium, calcium, magnesium, and zinc, the acid phosphates of organic bases such as alkyl and aryl amines, and the acid orthophosphates of hydrazine. All of these materials are dry on exposure to air, may be finely powdered, and are at least sparingly soluble or decomposable on the addition of water. Many other acid salts, such as bisulfates, are suitable chemically but tend to take up moisture on exposure to air. The acid phosphates of ammonium are preferred, because they decompose easily to form $P_2O_5$ which reacts with other ingredients of the composition. The diacid salts are preferred because the percentage of useful $P_2O_5$ is larger in the case of these compounds.

Suitable chlorides for the purpose of this invention are sodium chloride, barium chloride, ammonium chloride, the hydrochlorides of hydrazine and hydroxylamine, and certain alkyl and aryl chlorides or hydrochlorides, particularly those of organic bases or amines. While all these will meet the requirements, the use of ammonium chloride is preferred, for the same reasons that ammonium diacid orthophosphate is preferred.

Compounds of zirconium oxide which may be used are generally zirconium double silicates of first and second group elements, and zirconates of first and second group elements. Of these, magnesium zirconate, or the material known as calcium zirconium silicate, or a combination of both may be used. Magnesium zirconate serves the double purpose of supplying the magnesia required in the preferred form of the invention and also the zirconium oxide compound.

The magnesia may suitably consist of finely ground dead burned magnesite containing at least 70% MgO, or electrically fused magnesia. While magnesia ground by either wet or dry procedures can be used, dry milled −200 mesh magnesia is preferred. When, however, magnesia is used alone with the acid salts and halide, with or without the fluosilicate, and the amount of magnesia is sufficient to yield the necessary hardness, the composition is liable to certain defects which must be eliminated for complete success, particularly when used for the preparation of large castings. For example, the casting tends to shrink on setting and develops cracks due to the stress set up by the metal pattern pressing against the shrinking cement. Also, massive castings develop casting cracks exclusive of those caused by pattern stresses. Furthermore, setting takes places too fast and with too great a rise in temperature. Finally, the refractory mold formed therefrom, while quite hard, is very brittle and fragile and will not withstand any cross stress such as would be experienced in the occasional rough handling normally encountered. This last defect is no doubt due to the strains set up by the combination of the aforementioned defects.

These defects may be entirely eliminated by substituting for a substantial part of the total magnesia which appears to be normally necessary a zirconium double silicate of a first or second group element, a zirconate of a first or second group element, or combinations thereof. In some cases these compounds may completely replace magnesia. With such combinations strong, tough, easily handled cements are obtained free from the aforementioned defects and susceptible to wide variations of a controllable nature.

In many cases the combination of magnesia, acid phosphate, and chloride yields a bonding agent which has too short a working or fluidity period after mixing, particularly where castings weighing several pounds are to be made. In this case the addition of a minor quantity of fluosilicates markedly increases the setting time. The fluosilicates of ammonium, sodium, calcium, magnesium, etc. may be used, that of ammonium or sodium being preferred.

The various proportions of ingredients that can be used will now be stated. In each case these proportions are based on a specific volume of refractory aggregate of the preferred grain size distribution, the sum total of the ingredients being referred to hereinafter as a "unit." Each unit is defined as containing 33 to 35 cc. (e. g. 34 cc.) of refractory aggregate, the weight therefore depending and being proportional to the apparent specific gravity. For example, 33 ccs. of suitably ground quartz weighs 60 grams while 33 ccs. of suitably ground zircon weighs 115 grams. In other words, the same amount of bonding agent will yield the same finished strength and hardness for 60 grams of quartz as for 115 grams of zircon, etc.

Where dead burned magnesite is used alone, 8 to 12 grams of this material per unit is necessary, but in view of the defects mentioned above the preferred amounts lie between 2 and 8 (except where it is eliminated entirely) and the balance is made up with zirconium compounds. The preferred amount per unit is 5 to 6 grams of dead burned milled magnesite. The amount of acid salt, normally monoammonium diacid phosphate, may extend from 1 to 15 grams per unit, the higher the ratio of acid salt to magnesia content the higher the setting expansion. For this reason the acid salt content is normally kept to 6 to 10 grams per unit. The amount of double zirconium silicate or zirconate depends to a certain extent on the amount of magnesia used. The lower the amount of magnesia the higher the amount of these secondary agents, which in some cases may extend to as much as 15 parts per unit. For 5 grams of magnesia 4 to 6 grams of the zirconia derivatives are added. The added chloride is suitably placed between 1 and 6 grams per unit. The higher the amount used the higher the final strength and the higher the setting expansion. The normal preference is 2 to 3 grams of ammonium chloride per unit. The amount of fluosilicate added to extend the period of fluidity is proportional to the magnesia content; the preferred limits being 0.1 to 2.5 grams per unit. At 5 grams of magnesia per unit, setting time is extended 10 to 15 minutes by adding 0.5 to 1.0 gram sodium or ammonium fluosilicate per unit.

To impart expansion to the mass on firing, zirconium carbide or cyanonitride and manganese dioxide may be added in amounts necessary to yield the expansion in accordance with co-pending application Serial No. 265,133, filed March 31, 1939, now Patent No. 2,277,704. Other ingredients may be added for other purposes.

The ingredients having been chosen, the materials may then be mixed as follows: All the ingredients with the exception of the acid salt and half the refractory aggregate are thoroughly mixed and passed through a pulverizer of the swing hammer type. The remainder of the refractory aggregate is mixed with the acid salt and also passed through the pulverizer, and the whole is then thoroughly mixed. This procedure is used to prevent too intimate a contact of the bonding agents which might otherwise partially react on exposure to very humid atmospheres for extended periods. Such a procedure prevents decomposition of the powder in humid atmospheres.

The invention having been described, the following examples illustrate the practice of the invention:

Example 1

| | |
|---|---|
| Refractory aggregate of hereinbefore described particle size distribution____ccs__ | 34 |
| Magnesium zirconate (—200 mesh)_grams__ | 4 |
| Dry milled dead burned magnesite (—200 mesh) _____grams__ | 5 |
| Hydrated and powdered ammonium diacid phosphate _____grams__ | 6 |
| NH4Cl _____do____ | 2.5 |
| Acid washed zirconium carbide (—325 mesh)_____grams__ | 1.0 |
| Pyrolusite (—325 mesh)_____do____ | 2.0 |

Half the refractory aggregate plus all the ingredients except ammonium acid phosphate are mixed and pulverized together. The remainder of the refractory aggregate is then mixed and pulverized with the ammonium acid phosphate. The two mixtures are then thoroughly mixed together.

When ready for use, this composition requires 17 to 19 cc. of water for good working, and will have a working time before setting of 2 to 3 minutes, a setting expansion of 0.08% and a thermal expansion at 1750° F., 1.2% above that which would be developed were the refractory aggregate used alone.

When 2 grams of calcium zirconium silicate are substituted for half the magnesium zirconate in the above example, the setting expansion is 0.1%. When 6 grams of calcium zirconium silicate are substituted for all the magnesium zirconate, the setting expansion is 0.15%. When 0.5 gram of $Na_2SiF_6$ is added, the working time before setting is extended to 8 to 10 minutes. When 1.5 grams of $Na_2SiF_6$ are added, the working time before setting is extended to 20 to 25 minutes.

Example 2

| | |
|---|---|
| Refractory aggregate as above described cc__ | 34 |
| Magnesium zirconate_____grams__ | 4 |
| Milled magnesite_____do____ | 6 |
| Ammonium diacid phosphate_____do____ | 9 |
| Ammonium chloride_____do____ | 4 |
| Zirconium carbide_____do____ | 1.0 |
| Pyrolusite_____do____ | 2.0 |

This is mixed as in Example 1. When ready for use, 18 to 20 cc. of water are required. The setting expansion is 1.5% and the thermal expansion at 1750° F. is 1.2% over that of the refractory used. The working time before setting is 1½ to 2 minutes. When 1.0 gram of ammonium fluosilicate is added, the working time before setting is 8 to 10 minutes.

Example 3

| | |
|---|---|
| Refractory aggregate_____cc__ | 34 |
| Magnesium zirconate_____grams__ | 4 |
| Calcium zirconium silicate_____do____ | 12 |
| Acid ammonium phosphate_____do____ | 9 |
| Ammonium chloride_____do____ | 4 |
| Zirconium carbide_____do____ | 1.0 |
| Pyrolusite_____do____ | 2.0 |

When ready for use, 19 to 21 cc. of water are required. The working time is 5 to 7 minutes. When 0.3 grams of ammonium fluosilicate are added, the working time is 10 to 12 minutes. When 4 grams of sodium zirconium silicate are substituted for magnesium zirconate, the working time is 6 to 9 minutes, and the setting expansion 0.22%.

In every case, the mixture of the ingredients as described yields a shelf stable dry powder suitable for use as a casting cement on the simple addition of water.

As many variations are possible within the scope of this invention, it is not intended to be limited except as defined by the appended claims.

I claim:

1. A dry solid refractory composition containing a major portion of refractory aggregate, a minor portion of a halide of low hygroscopicity, a minor portion of a non-hygroscopic acid salt, and a minor portion of a non-hygroscopic substance capable of reacting with said acid salt, said substance being taken from the class consisting of magnesia and metal oxide and non-metal oxide derivatives of zirconium oxide.

2. A dry solid refractory composition containing a major portion of refractory aggregate, a minor portion of a chloride of low hygroscopicity, a minor portion of a non-hygroscopic acid phosphate, and a minor portion of a non-hygroscopic substance capable of reacting with said acid phosphate, said substance being taken from the class consisting of magnesia and metal oxide and non-metal oxide derivatives of zirconium oxide.

3. A dry solid refractory composition containing a major portion of refractory aggregate, a minor portion of a chloride of low hygroscopicity, a minor portion of a non-hygroscopic acid phosphate, and a minor portion of magnesia.

4. A dry solid refractory composition containing a major portion of refractory aggregate, a minor portion of a chloride of low hygroscopicity, a minor portion of a non-hygroscopic acid phosphate, and a minor portion of a zirconate of a metal of the second group of the periodic system.

5. A dry solid refractory composition containing a major portion of refractory aggregate, a minor portion of a chloride of low hygroscopicity, a minor portion of a non-hygroscopic acid phosphate, and a minor portion of a double zirconium silicate of a metal of the second group of the periodic system.

6. A dry solid refractory composition containing a major portion of refractory aggregate, a minor portion of ammonium chloride, a minor portion of an acid phosphate taken from the group consisting of sodium, calcium, magnesium, zinc and ammonium and inorganic and organic derivatives of ammonium, and a minor portion of a non-hygroscopic substance capable of reacting with said acid phosphate, said substance being taken from the class consisting of magnesia and metal oxide and non-metal oxide derivatives of zirconium oxide.

7. A dry solid refractory composition containing a major portion of refractory aggregate, a minor portion of ammonium chloride, a minor portion of an ammonium acid phosphate, and a minor portion of magnesia.

8. A dry solid refractory composition containing a major portion of refractory aggregate, a minor portion of ammonium chloride, a minor portion of an ammonium acid phosphate, and a minor portion of a zirconate of a metal of the second group of the periodic system.

9. A dry solid refractory composition containing a major portion of refractory aggregate, a minor portion of ammonium chloride, a minor portion of an ammonium acid phosphate, and a minor portion of a double zirconium silicate of a metal of the second group of the periodic system.

10. A dry solid refractory composition containing a major portion of refractory aggregate, a minor portion of a halide of low hygroscopicity, a minor portion of a non-hygroscopic acid salt, a minor portion of a non-hygroscopic substance capable of reacting with said acid salt, said substance being taken from the class consisting of magnesia and metal oxide and non-metal oxide derviatives of zirconium oxide, and a minor portion of a fluosilicate.

11. A dry solid refractory composition containing a major portion of refractory aggregate, a minor portion of ammonium chloride, a minor portion of an acid phosphate taken from the group consisting of sodium, calcium, magnesium, zinc and ammonium and inorganic and organic derivatives of ammonium, a minor portion of a non-hygroscopic substance capable of reacting with said acid phosphate, said substance being taken from the class consisting of magnesia and metal oxide and non-metal oxide derivatives of zirconium oxide, and a minor portion of sodium fluosilicate.

12. A dry solid refractory composition containing a major portion of refractory aggregate, a minor portion of ammonium chloride, a minor portion of an acid phosphate taken from the group consisting of sodium, calcium, magnesium, zinc and ammonium and inorganic and organic derivatives of ammonium, a minor portion of a non-hygroscopic substance capable of reacting with said acid phosphate, said substance being taken from the class consisting of magnesia and metal oxide and non-metal oxide derivatives of zirconium oxide, and a minor portion of ammonium fluosilicate.

13. A dry solid refractory composition containing a major portion of refractory aggregate, and in addition, per unit of 34 cc. of refractory aggregate, 1 to 6 grams of ammonium chloride, 1 to 15 grams of an ammonium acid phosphate, and 2 to 12 grams of magnesia.

14. A dry solid refractory composition containing a major portion of refractory aggregate, and in addition, per unit of 34 cc. of refractory aggregate, 1 to 6 grams of ammonium chloride, 1 to 15 grams of an ammonium acid phosphate, and 1 to 15 grams of a zirconate of a metal of the second group of the periodic system.

15. A dry solid refractory composition containing a major portion of refractory aggregate, and in addition, per unit of 34 cc. of refractory aggregate, 1 to 6 grams of ammonium chloride, 1 to 15 grams of an ammonium acid phosphate, and 1 to 15 grams of a double zirconium silicate of a metal of the second group of the periodic system.

16. A dry solid refractory composition containing a major portion of refractory aggregate, and in addition, per unit of 34 cc. of refractory aggregate, 1 to 6 grams of ammonium chloride, 1 to 15 grams of an ammonium acid phosphate, 8 to 12 grams of magnesia, and 1 to 15 grams of a zirconate of a metal of the second group of the periodic system.

17. A dry solid refractory composition containing a major portion of refractory aggregate, and in addition, per unit of 34 cc. of refractory aggregate, 1 to 6 grams of ammonium chloride, 1 to 15 grams of an ammonium acid phosphate, 8 to 12 grams of magnesia, and 1 to 15 grams of a double zirconium silicate of a metal of the second group of the periodic system.

18. A dry solid refractory composition containing a major portion of refractory aggregate, and in addition, per unit of 34 cc. of refractory aggregate, 1 to 6 grams of ammonium chloride, 1 to 15 grams of an ammonium acid phosphate, 8 to 12 grams of magnesia, 1 to 15 grams of a zirconate of a metal of the second group of the periodic system, and 1 to 2.5 grams of sodium fluosilicate.

19. A dry solid refractory composition containing a major portion of refractory aggregate, and in addition, per unit of 34 cc. of refractory aggregate, 1 to 6 grams of ammonium chloride, 1 to 15 grams of an ammonium acid phosphate, 8 to 12 grams of magnesia, and 1 to 15 grams of a double zirconium silicate of a metal of the second group of the periodic system, and 1 to 2.5 grams of sodium fluosilicate.

20. A dry solid refractory composition containing a major portion of refractory aggregate, and in addition, per unit of 34 cc. of refractory aggregate, 1 to 6 grams of ammonium chloride, 1 to 15 grams of an ammonium acid phosphate, 8 to 12 grams of magnesia, 1 to 15 grams of a zirconate of a metal of the second group of the periodic system, and 1 to 2.5 grams of ammonium fluosilicate.

21. A dry solid refractory composition containing a major portion of refractory aggregate, and in addition, per unit of 34 cc. of refractory aggregate, 1 to 6 grams of ammonium chloride, 1 to 15 grams of an ammonium acid phosphate, 8 to 12 grams of magnesia, 1 to 15 grams of a double zirconium silicate of a metal of the second group of the periodic system, and 1 to 2.5 grams of ammonium fluosilicate.

EUGENE WAINER.